Sept. 13, 1966          M. F. BERGSTROM          3,272,538
                     RESTRAINED PIPE JOINTS
Filed Nov. 17, 1964                      2 Sheets-Sheet 1

INVENTOR.
MYRON F. BERGSTROM
BY Maurice W. Ryan
ATTORNEY

Sept. 13, 1966 M. F. BERGSTROM 3,272,538
RESTRAINED PIPE JOINTS
Filed Nov. 17, 1964 2 Sheets-Sheet 2
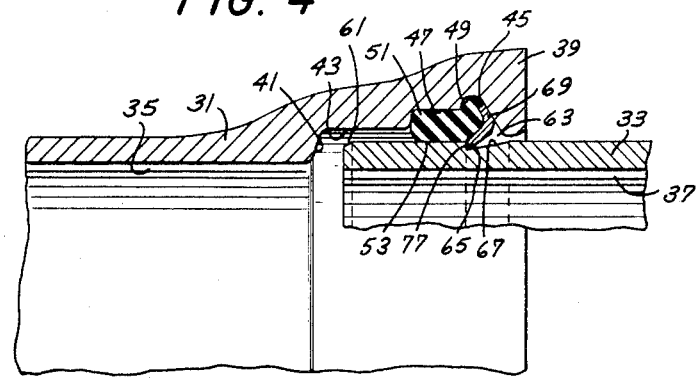
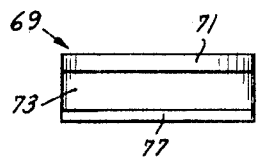
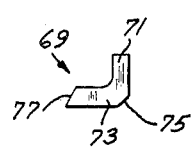
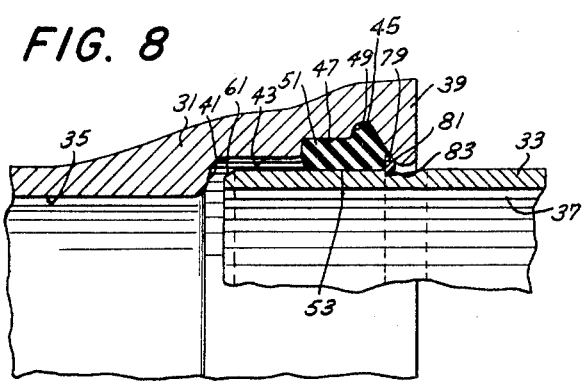
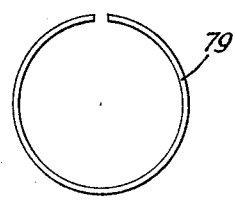
INVENTOR.
MYRON F. BERGSTROM
BY Maurice W. Ryan
ATTORNEY

United States Patent Office 3,272,538
Patented Sept. 13, 1966

3,272,538
RESTRAINED PIPE JOINTS
Myron F. Bergstrom, South Charleston, W. Va., assignor to Union Carbide Corporation, a corporation of New York
Filed Nov. 17, 1964, Ser. No. 411,775
3 Claims. (Cl. 285—231)

This application is a continuation-in-part application of application Serial No. 83,559, filed January 18, 1961, now abandoned.

The present invention relates to piping systems using restrained slip-in pipe joints of the bell and spigot type and, more particularly, to such pipe joints restrained against longitudinal separation by cooperating components comprising positive latching means completely internal of the joints. While the invention can be used effectively on other types of piping such as copper, steel or other metal tubes or pipes or tubes or pipes made of asbestos, ceramic, concrete or similar materials, it is particularly applicable to cast iron and ductile iron pipes assembled by means of bell and spigot joints.

Problems encountered in the use of slip-in type pipe joints, as illustrated in particular by the bell and spigot joint, are well-known to persons familiar with the piping art. Of special interest is the problem of making such joints fluid-tight and maintaining fluid-tight sealing when the joints are subjected to high pressures in the order of, for example, 1000 pounds per square inch and above. Most known joints and jointing methods depend for sealing upon the inclusion in an assembled joint of a gasket made of rubber or a rubber-like material which is compressed between the outer peripheral wall of a spigot end of a pipe section and the inner peripheral wall of a bell end of an adjacent pipe section. In an attempt to restrain adjacent joined pipe sections from separating under axial force effects of internal pressure and fluid inertial forces, several known joints include a radially protruding annular rib formed integrally on the gasket, arranged to cooperatively engage an oppositely annularly disposed recess in the inner wall of the bell portion of a pipe. Alternatively, some joints include a radially intruding annular rib formed integrally on the gasket, arranged to cooperatively engage an oppositely disposed annular recess in the outer peripheral wall of the spigot portion of a pipe. Forces tending to separate adjacent pipe sections longitudinally are resisted by either friction between the gasket and the pipe walls compressing the gasket or, in the joints having ribbed gaskets, by a combination of friction between the gasket and the pipe walls compressing the gasket and shear at the base of the rib. Despite many variations and myriad intricate configurations of the cooperating bells, spigots and gaskets of known pipe joints, no combination thereof has been found to withstand, without gasket failure or longitudinal joint separation, internal pipe pressures of more than several hundred pounds per square inch unless restraining means external to the piping and piping joints have also been included in the piping system construction. Such external restraining means include split rings assembled over adjacent pipe sections on either side of a joint, having draw bolts through the rings arranged parallel to the pipe to tensionally restrain axial inertial and pressure forces and massive concrete or the like blocking disposed at pipe ends and elbows arranged to restrain such axial forces in the piping. While the addition of blocking and other restraining structures mitigate the pipe separation under load problem to a certain extent, such structures are cumbersome, expensive, and time consuming to install.

It will therefore be apparent that a slip-in type pipe joint and piping system which can be easily assembled and withstands gasket failure and pipe section axial separation at pressures of 1000 pounds per square inch and greater, up to the pipe bursting limit, without supplemental external bracing and blocking or the like offers outstanding advantages over known joints and comprises a significant contribution to the piping art.

It is therefore an object of this invention to provide a novel piping system involving positively locked pipe joints, particularly of the bell and spigot variety, which system can be installed by routinely competent journeymen in the trade without special tools or equipment.

It is a further object of this invention to provide a piping system which can be installed in underground locations with significantly less excavation since in available systems extra excavation is required at all points in a pipe line where massive blocking and external joint restraint structures are required.

The invention also comprises novel details of construction and novel combinations of components, together with other features and results which will be more apparent from the following description.

In the drawings:

FIGURE 4 is a fragmentary longitudinal sectional view of a joint comprising a pipe bell, pipe spigot, gasket and latch of an alternative embodiment of apparatus according to the present invention, in completely assembled condition;

FIGURE 5 is a plan view of a latch of the apparatus of FIGURE 4;

FIGURE 6 is a frontal elevation view of the latch of FIGURE 5;

FIGURE 7 is a side elevation view of the latch of FIGURES 5 and 6;

FIGURE 8 is a fragmentary longitudinal sectional view of a joint comprising a pipe bell, pipe spigot, gasket and latch of a second alternative embodiment of apparatus according to the present invention, in completely assembled condition;

Figure 1:
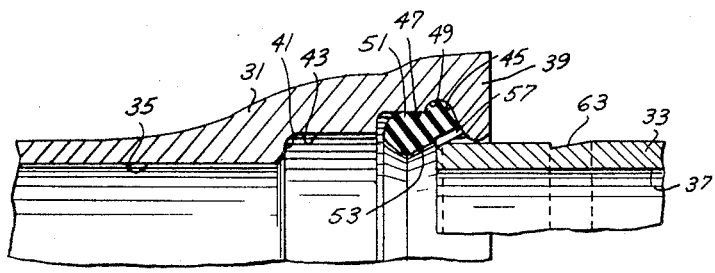
FIGURE 1 is a fragmentary longitudinal sectional view of a joint comprising a pipe bell, pipe spigot, gasket and latch according to the present invention, showing the initial spigot insertion contact as the joint is assembled.
Figure 2:
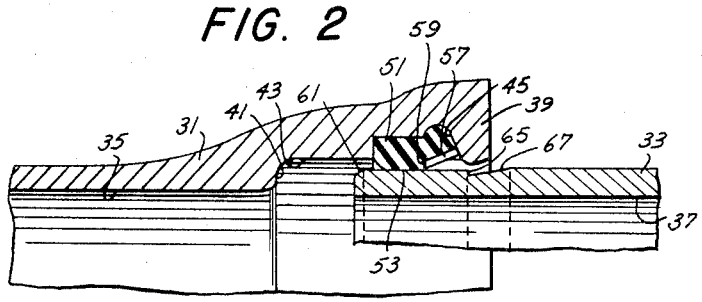
FIGURE 2 shows the apparatus of FIGURE 1 in a partially assembled condition.
Figure 3:
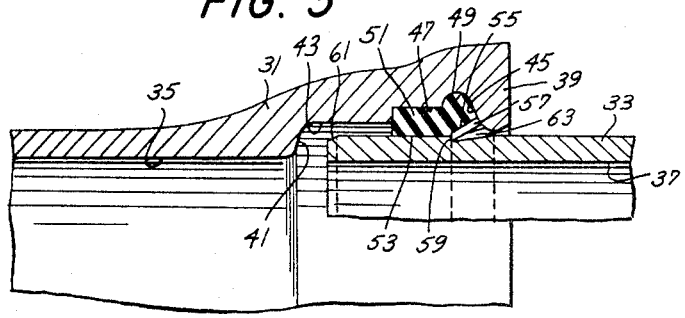
FIGURE 3 shows the apparatus of FIGURE 1 in completely assembled condition.

Referring to FIGURES 1 through 3 of the drawings, a pipe joint comprising a bell 31 and a spigot 33 of two adjacent pipe sections in a piping system according to the invention is shown in various stages of assembly. Inner cylindrical surfaces 35 and 37 define substantially equal inside diameter walls of the respective pipe sections and an intruding annulus on bell 31 defines a bell lip 39. The bell interior comprises an enlarged diameter axially-extending opening bounded by a generally radially extending shoulder 41, an axially and radially extending rear wall 45 of bell lip 39 and an axially extending bell inner wall 43. Wall 43 is diametrically disposed in the bell to effect circumferential clearance for the introduction of spigot 33 into the bell, as is the axially extending edge of bell lip 39. Adjacent the rear wall 45 of bell lip 39 is a recess 47 formed in wall 43 and having an annular radially extending groove 49, said recess and groove being shaped to accommodate a formed sealing gasket 51 which is inserted in the bell prior to joint assembly. Gasket 51 is made of rubber or plastic any other suitable resilient elastomeric material which will not be affected adversely by fluids which may be transported through the piping system or by the environment surrounding the piping system and which can be flexed sufficiently for installation in the bell, where, due its resiliency, it will substantially resume its original form and intimately engage the surfaces of groove 49 and part of the axially extending surface of recess 47 as shown in FIGURE 1 of the drawings. Gasket 51 is formed with an inner surface 53 which, prior to joint assembly but with the gasket in place in bell 31, intrudes radially and axially from bell lip 39 defining, at its innermost part, a circumference smaller than the outer circumference of spigot 33. From points located approximately at the longitudinal midpoint of surface 53, a multiplicity of regularly spaced circumferentially disposed slot-form openings defining latch pockets 55 extending through gasket 51, axially and radially and substantially normal to the inclined rear wall 45 of bell lip 39, which wall intrudes radially and axially from groove 49 in a direction substantially normal to the direction of latch pockets 55.

In each latch pocket 55 is positioned a latch 57 made from metal or other suitable material having stress capabilities of an order suitable to effect design balance with the stress capabilities of the particular piping used in the piping system and of dimensions slightly larger than the dimensions of the latch pockets in order that said latches will be resiliently held in the latch pockets when positioned therein. The latches are assembled in the gasket before the gasket is positioned in bell 31, preferably being molded integrally with the gasket during it manufacture, and, as shown in FIGURE 1 of the drawings, intrude axially and radially from bell lip 39 and substantially normal to the wall 45 in the direction in which spigot 33 must be urged to make up the joint. Each latch 57 may be provided with a bevelled edge 59 and the multiple bevelled edges of the assembled latches in place in the installed gasket define a circumference smaller than the outer circumference of spigot 33.

Spigot 33 is provided with a bevelled leading edge 61, normally formed on the pipe during its manufacture, to facilitate entry of the spigot into the gasket-fitted bell. Also on spigot 33, at a point less distant from the bevelled edge 61 than the dimension between bell lip 39 and bell shoulder 41 of bell 31, an annular groove is formed having a radially extending wall 65 and an inclined generally axially extending wall 67 defining a circumferential latch port 63 on the spigot. The junction of walls 65 and 67 is preferably slightly round to reduce stress concentrations at the juncture point, a purpose which will be readily understood by persons familiar with the art in view of the ensuing description of the cooperating function of latch port 63 and the latches 57. It should also be noted here that the arrangement whereby the latches are arrayed substantially normal to the inner wall 45 of the bell lip 39 provides for the most efficient structural loading on the latches, loading them in effect like struts.

FIGURE 1 of the drawings shows sectionally the relative positions of the several above-described components at the start of a joint assembly operation with the bevelled edge 61 of spigot 33 making initial contact with a latch edge 59. Here it should be noted that groove 49 cooperates with an oppositely disposed annular rib on gasket 51 to restrain axial movement of the gasket during joint assembly as well as to insure accurate seating of the gasket when it is installed in the bell 31.

FIGURE 2 illustrates the relative positions assumed by the various components comprising the joint when spigot 33 has been inserted approximately half way into the bell. Gasket 51 is now fully compressed and completely fills recess 47. Insertion of the spigot is continued until radial wall 65 of latch port 63 is pushed past latch edges 59, at which time, resilient force stored in gasket 51 by virtue of its compression, urges latches 57 into latch port 63, effecting positive latch bearing between latch edges 59 and the latch port radial wall 65 as shown in FIGURE 3 of the drawings. Should further insertion occur, latch edges 59 will be expanded by the inclined wall 67 of latch port 63 until spigot movement is arrested whn the spigot leading edge impinges on bell shoulder 41, but will return to latching position against latch port radial wall 65 when axial separation force is exerted on the joint either by a workman installing the joint or by internal pressure when the joint is placed in service.

With the joint completely assembled as shown in FIGURE 3, gasket 51, in its compressed state, intimately engages recess 47, groove 49 and the outer circumferential wall of spigot 33, tightly sealing the joint. Internal pressure-induced axial forces and fluid inertial forces which tend to cause joint separation are restrained by combinations of compression and shear resistances developed in the latches 57, bearing substantially normally on wall 45 of the bell lip 39 and the spigot wall axially between spigot leading edge 61 and latch port radial wall 65. The same internal pressures which produce axial forces will also compressively load gasket 51 through the annular space between the bell inner wall 45 and the end of spigot 33 and, since the gasket is made of elastomeric material, the applied compressive force will be transmitted through said gasket to effect additional intruding force on the latches 57.

FIGURES 4 through 7 inclusive, of the drawings, illustrate an alternative embodiment of apparatus according to the present invention, FIGURE 4 showing a pipe joint completely assembled and FIGURES 5 through 7 inclusive showing details of an angle latch 69. Components which are similar to the above-described components of FIGURES 1 through 3 are identically designated in FIGURE 4. This alternative embodiment differs from that first described only in the configuration and arrangement of the latches. A multiplicity of arcuately extending angle-shaped latches 69, each having a generally radially extending leg 71, a generally axially extending leg 73 disposed normally to said radially extending leg, a bevelled heel 75 at the junction of legs 71 and 73 and a bevelled edge 77 on leg 73, are arranged circumferentially at regularly spaced intervals inside the bell lip 39 with legs 71 thereof resiliently held between gasket 51 and rear wall 45 of bell lip 39. Here it should be noted that, in this as well as in the earlier described embodiment, substantially uniform peripheral spacing of the latches is required to avoid unequal loading and consequent canting of the connected pipe sections in use. Latch pockets 55, such as were included in the earlier described embodiment, are not required and the latches 69 are preferably field-installed after gasket 51 is placed in the bell 31, but may be affixed to the gasket with a suitable adhesive during gasket manufacture or prior to gasket installation. Should any slight radial intrusion of the latches 69 occur due to slippage prior to joint assembly, bevelled heel 75 provides a camming surface against which the bevelled leading edge 61 of spigot 33 will act, urging the intruding latches back into proper position as joint assembly is started.

Because of the manner in which radial leg 71 of latch 69 bears on the inclined rear wall 45 of bell lip 39, the embodiment illustrated in FIGURES 4 through 7 inclusive is particularly useful in mitigating shearing failures through bell lip 39 where, due to the nature of some particular piping materials, low shear stress may present the problem. The effect of this latch design then is to provide one strut-like leg 73 to resist forces tending to separate the joint, and one footing-like leg to distribute the load imposed by the strut over a greater area of the bell lip inner wall 45.

Joint assembly procedure follows that described hereinbefore for the first-mentioned embodiment. Pressure-induced axial forces and fluid inertial forces which tend to cause joint separation are resisted by combinations of compression, shear and bearing in the latches 69, bell lip 39 and the spigot wall between spigot leading edge 61 and latch port radial wall 65.

A second alternative embodiment of apparatus according to the present invention is illustrated in FIGURES 8 and 9 of the drawings, FIGURE 8 showing a pipe joint completely assembled and FIGURE 9 showing a frontal elevation view of a snap-ring latch 79. Again, components which are similar to those hereinbefore identified in the description of the earlier-described embodiments, are identically designated in FIGURE 8, this embodiment differing from earlier-described embodiments only in the configuration, arrangement and operation of the latch 79. Snap-ring latch 79 is made of a continuous piece of tempered steel formed to encircle approximately 350 degrees of circumference of bell lip rear wall 45 when it is compressed, inserted in the bell after installation of gasket 51 and released. In position in the bell, snap-ring latch 79 is restrained axially between the bell lip rear wall 45 and the gasket 51. An outer bevelled edge 81 of latch 79 bears on bell lip rear wall 45 and an inner bevelled edge 83 intrudes radially inward to engage the spigot 33 outer wall and, at joint completion, latch port 63. Joint assembly procedure follows that described previously. As the spigot is inserted, leading edge 61 first engages snap-ring latch inner bevelled edge 83 and, by camming action, expands the latch radially. As spigot insertion is continued, snap-ring latch inner bevelled edge 83 rides slideably on the spigot outer wall until it engages latch port 63, when it contracts due to its resiliency, and snaps into place, securely locking the joint. Pressure-induced axial forces and fluid inertial forces tending to cause joint separation are resisted by combinations of compression, shear and bearing stresses developed in the several cooperating joint components.

*Example I*

In a particular embodiment of apparatus of the present invention according to FIGURES 4 through 7, inclusive, of the drawings, a six-inch nominal diameter 25.9 lbs. per foot cast iron pipe joint was assembled, which included three equally spaced circumferentially arranged angle latches 69 made of pipe grade carbon steel, ASTM designation A106, each of an arcuate length of 1½ inches, having a radial leg 71 of approximately ⅜ inch and an edge 77 presenting a radially extending surface of about ⅛ inch adapted to engage a latch port radial wall 65 of about the same dimension, i.e., ⅛ inch measured radially. When hydrostatically tested, the joint failed at 975 p.s.i.g., failure occurring in shear through the angle latch radial legs 71. No leaks occurred in the joint until failure. Maximum normal working pressure in such pipe is in the order of from 100 p.s.i.g. to 125 p.s.i.g.

*Example II*

In further tests performed on an embodiment similar to that described in Example I, above, hydrostatic pressure within the joint was raised to 300 p.s.i.g. and maintained at that level for 64 hours. No leaks occurred in the joint. The same joint was then subjected to a load cycling test which comprised raising hydrostatic pressure in the joint from 0 p.s.i.g. to 300 p.s.i.g. and dropping the pressure to 0 p.s.i.g. again eleven times successively. No leaks occurred in the joint.

*Example III*

In a discrete embodiment of apparatus of the present invention according to FIGURES 8 and 9 of the drawings, a six-inch nominal diameter, 25.9 lbs. per foot cast iron pipe joint was assembled, which included a snap ring latch 79 made of high carbon spring steel, having a radial overall dimension of ¼ inch, an axial overall dimension of ⅛ inch, an outer bevelled edge of approximately ⅛ inch and an inner bevelled edge of approximately 5/32 inch. When hydrostatically tested to failure, the joint failed at a pressure of 1500 p.s.i.g., failure occurring in shear through an arc of about 205 degrees of the bell lip 39. No leaks occurred in the joint prior to failure. The observed test indicates a working safety factor of about 15 for such joints when used in 100 p.s.i.g. systems.

*Example IV*

Prior to the test to failure described in Example III, above, the same joint was subjected to a load cycling test comprising thirteen cycles of hydrostatic pressure increasing from 0 p.s.i.g. to 300 p.s.i.g. and back to 0. No leaks occurred in the joint. The pressure was then raised to 300 p.s.i.g. and maintained at that level for 24 hours. No leaks occurred in the joint.

*Example V*

In order to evaluate joint performance under conditions of non-alignment of adjacent pipe sections, a joint similar to that described in Examples III and IV was constructed, and deflected to an axial displacement of approximately 6 degrees from the longitudinal axis. In this condition, the joint was hydrostatically loaded to 200 p.s.i.g. for 10 minutes. No leaks occurred.

Pressures designated in the examples and elsewhere in the specification as p.s.i.g. are pressures in pounds per square inch gage.

The foregoing examples clearly illustrate the ability of joints according to the present invention not only to withstand extraordinary internal pressures for protracted periods of time, to function perfectly under conditions of cyclic pressure loading but also to function without difficulties under conditions of pipe misalignment as compared to known joint constructions which have been found to separate axially under even slight internal pressures particularly, where fluid inertial forces are present and to leak under slight pipe misalignment.

While the foregoing description and examples refer mostly to bell and spigot type pipe joints of the through type, adaptations of the structure of the present invention will be apparent to persons familiar with the piping art. Sleeve type couplings used to connect straight end pipes can be readily modified to provide for the inclusion of resilient gaskets and latch components and latch ports disposed to cooperate with the latches can be easily milled, rolled or otherwise formed near the pipe ends. Caps used to dead-end pipes and pipe terminal connectors on vessels and other equipment, as well as T's, L's, crosses and similar type connectors used to join two or more pipe sections can also be readily adapted to function in accordance with the present invention.

Myriad latch forms will also operate successfully in the apparatus of the present invention. For example, snap-rings similar to latch 79 can be fabricated of steel wire formed in a wave shape and positioned in the bell 31 to intrude axially and radially from bell lip 39. Latches can be cast, milled, stamped or bent to shape, the only requirements being that they cooperate with the latch ports or otherwise engage the pipe, that they are adapted to effect positive latching action either through self-resiliency or through resilient action of a sealing gasket and, that they have a thickness (or a leg width dimension in the case of angle latches) greater than the distance between the radially intruding extremity of the bell portion of the connection and the outer peripheral surface of the spigot portion of the connection, in the fully assembled joint condition, that they assume axial loads induced by piping internal pressures by substantially axial loading within themselves.

While, in the foregoing description, certain specific details and operative steps have been set forth, together with certain suggested modifications, it will be obvious that additional variations may be made in these without departing from the spirit of the present invention. The foregoing description has been given for clearness of understanding only, and no unnecessary limitations should be understood therefrom.

What is claimed is:

1. A connection for pipes comprising, in combination, a hollow cylindrical member provided with a radially intruding extremity defining a circumference larger than the outer circumference of a pipe section to be connected and having a radially and axially extending annular interior wall; a pipe section substantially coaxially disposed in said member; an annular groove formed in the inner wall of the hollow cylindrical member adjacent the end thereof, said groove being provided with an axially extending wall, a radially inwardly directed shoulder terminating the inner axial end of said groove and said radially and axially extending annular interior wall terminating the other end of said groove; said pipe section having a peripheral latch port formed on its outer surface adjacent its connection end; a resilient annular gasket arranged in and substantially filling said annular groove and sealably engaging said hollow cylindrical member and said pipe section, a portion of said gasket being compressibly confined between and exerting expansive force substantially radially on said pipe section and on said member; and latching means conjunctively arranged and peripherally disposed with said gasket and cooperatively engaging, under the expansive force of said gasket, said peripheral latch port on said pipe section and the radially and axially extending annular interior wall of said hollow cylindrical member along loading lines substantially normal to said radially and axially extending annular interior wall to lockably restrain axial separation of said member and said pipe section, said latching means having a thickness greater than the distance between the radially intruding extremity of the hollow cylindrical member and the outer peripheral surface of the pipe section.

2. A pipe connection comprising, in combination, a first pipe section having a radially enlarged end provided with a radially intruding extremity defining a circumference larger than the outer circumference of a second pipe section and having a radially and axially extending annular interior wall; a second pipe section substantially coaxially disposed in said radially enlarged end of said first pipe section; an annular groove formed in the inner wall of the first pipe section adjacent the end thereof, said groove being provided with an axially extending wall, a radially inwardly directed shoulder terminating the inner axial end of said groove and said radially and axially extending annular interior wall terminating the other end of said groove; said second pipe section having a peripheral latch port formed on its outer surface adjacent its connection end; a resilient annular gasket arranged in and substantially filling said annular groove and sealably engaging said pipe sections, a portion of said gasket being compressibly confined between and exerting expansive force substantially radially on said pipe sections; a multiplicity of latches conjunctively arranged and peripherally disposed with said gasket, each extending exially and radially along a line substantially normal to said radially and axially extending annular interior wall of the intruding extremity of said first pipe section and cooperatively engaging, under the expansive force of said gasket, said radially and axially extending annular interior wall of said first pipe section and said peripheral latch port on said second pipe section to lockably restrain axial separation of said pipe sections, said latches having a thickness greater than the distance between the radially intruding extremity of the first pipe section and the outer peripheral surface of the second pipe section.

3. A pipe connection according to claim 2 wherein each of said latches is provided with an integral generally radially outwardly extending leg lying parallel to and in engagement with said radially and axially extending annular interior wall, each of said legs having a width dimension greater than the distance between the radially intruding extremity of the first pipe section and the outer peripheral surface of the second pipe section.

References Cited by the Examiner

UNITED STATES PATENTS

| | | | |
|---|---|---|---|
| 655,033 | 7/1900 | Vanderman | 285—374 X |
| 2,201,372 | 5/1940 | Miller | 285—105 |
| 2,230,725 | 2/1941 | Nathan | 285—340 X |
| 2,398,399 | 4/1946 | Alexander | 285—232 |
| 2,474,319 | 6/1949 | Muller | 285—343 |
| 2,491,004 | 12/1949 | Graham | 285—105 |
| 2,995,388 | 8/1961 | Morello et al. | 285—340 |

FOREIGN PATENTS

| | | |
|---|---|---|
| 218,769 | 12/1958 | Australia. |
| 594,113 | 5/1959 | Italy. |

CARL W. TOMLIN, *Primary Examiner.*

D. W. AROLA, *Assistant Examiner.*